(12) United States Patent
Ball et al.

(10) Patent No.: US 7,024,420 B2
(45) Date of Patent: Apr. 4, 2006

(54) RUN-TIME ACCESS TECHNIQUES FOR DATABASE IMAGES

(75) Inventors: Linda S. Ball, Austin, TX (US);
William R. Cunningham, Austin, TX (US); Stanley James Dee, Austin, TX (US); Thomas G. Price, Austin, TX (US)

(73) Assignee: BMC Software, Inc., Houston, TX (US)

( * ) Notice: Subject to any disclaimer, the term of this patent is extended or adjusted under 35 U.S.C. 154(b) by 520 days.

(21) Appl. No.: 10/135,652

(22) Filed: Apr. 30, 2002

(65) Prior Publication Data

US 2003/0204510 A1 Oct. 30, 2003

(51) Int. Cl.
*G06F 17/30* (2006.01)

(52) U.S. Cl. ...................... 707/102; 707/101
(58) Field of Classification Search .................. 707/1, 707/2, 3, 4, 8, 9, 10, 100, 101, 102, 104, 707/201, 204, 205; 709/201, 209
See application file for complete search history.

(56) References Cited

U.S. PATENT DOCUMENTS

| | | | |
|---|---|---|---|
| 5,675,785 A * | 10/1997 | Hall et al. | 707/100 |
| 5,852,715 A * | 12/1998 | Raz et al. | 709/201 |
| 5,873,088 A * | 2/1999 | Hayashi et al. | 707/100 |
| 6,006,216 A * | 12/1999 | Griffin et al. | 707/2 |
| 6,138,162 A * | 10/2000 | Pistriotto et al. | 709/229 |
| 6,438,538 B1 * | 8/2002 | Goldring | 707/3 |
| 6,609,126 B1 * | 8/2003 | Smith et al. | 707/8 |
| 6,694,306 B1 * | 2/2004 | Nishizawa et al. | 707/3 |
| 6,741,997 B1 * | 5/2004 | Liu et al. | 707/102 |

* cited by examiner

*Primary Examiner*—Jeffrey Caffin
*Assistant Examiner*—Yicun Wu
(74) *Attorney, Agent, or Firm*—Wong, Cabello, Lutsch, Rutherford & Brucculeri, LLP

(57) ABSTRACT

Techniques to provide run-time access to a database image through a target database management system (DBMS) are described. An empty database in the target DBMS (the "target database") is created having substantially the same schema as the database image. At run-time, queries directed to the target database are intercepted and redirected to the database image. Information returned in response to the redirected query is modified so that internal database identifiers retrieved from the database image are replaced with like database identifiers associated with the target database management system. Thus, run-time access to database image content is provided without the need to load the database image's data content into a target database.

39 Claims, 3 Drawing Sheets

RUN-TIME ACCESS TECHNIQUES FOR DATABASE IMAGES

BACKGROUND

The invention relates generally to computer databases and more particularly, but not by way of limitation, to techniques for providing user access to database images.

Database information is typically used for many different purposes within a single organization. In many modern organizations, databases are used to store a businesses operational data. Such data may be used, for example, by order entry, payroll and invoicing applications. The same data may also be used by analysts looking for business trends, evidence of fraud and the like. In addition, information technology and product development personnel often use databases to develop, test and troubleshoot applications. Each class of user (e.g., accounting, order, product development and business analyst) has different requirements for the underlying data, requirements that are often not compatible with one another. For example, an analyst performing detailed trend analysis on product purchasing data may significantly impact the response time for an order entry application using the same underlying data. To mitigate the conflicts between various users or to limit access to the primary data, databases, or portions thereof, are often copied to another database.

In one prior art technique, data is copied from a source database (e.g., an order-entry database) to a target database. Probably the most common method used to copy data from one database to another is to unload the data from the source database and load it into the target database. Although straightforward, this method requires significant resources in terms of central processor unit time and input-output bandwidth on both the source and target database systems. In addition, copy operations typically read all of the source data, write all of the source data to one or more temporary files, read all of the data (again) from the temporary files and then write (again) all of the data to the new target database. Further, during the initial read operation, i.e., from the source database to the one or more temporary files, write-access to the source database is almost always blocked to ensure the unload operation produces a consistent copy.

In another prior art technique, the copy operation takes advantage of prior made "backup" copies or images of the source database. Often, backup copies are made (on regular intervals) that are initially only readable by the database system that created them. However, utility applications may be created that read a standard backup copy, and then translates and/or converts the data so that it may be written to (and subsequently accessed by users of) the new target database. One aspect of such utility applications is that they are also required to read and translate the source database's indexes (i.e., rebuild the indexes). These copy-from-backup techniques may also affect, or limit, the availability of the source data. For example, write-access to the source database is almost always blocked to ensure the copy operation produces a consistent copy. Alternatively, the copy operation may use the source databases log files to generate a consistent copy. A disadvantage of this approach, however, is that using log files to produce a consistent copy can require a significant amount of time and consume significant amounts of processor and input-output resources.

Referring to FIG. 1, in a typical environment source user 100 interacts with source database management system (DBMS) 105 to access (read and write) source database 110 retained in storage system 115. In the ordinary course of operations, image copies of source database 110 are often made for purposes of backup and/or disaster recovery. For example, image 120 represents an image copy of source database 110. A characteristic of image copies, such as image 120, is that they are replicas of their source database. This means that the schema (structure), data (content, including indexes) and internal source DBMS identifiers associated with source database 110 are replicated substantially identically in image 120. A consequence of this latter characteristic is that to avoid name-space conflicts, no DBMS other than source DBMS 105 can generally access image 120. Accordingly, if the data in image 120 is to be made available to target user 125 through target DBMS 130, its data must be extracted and copied 135 into a format compatible with the target DBMS, i.e., the data content of image 120 is copied into target database 140 as described above.

Thus, it would be beneficial to provide a mechanism to allow access to the data captured in image 120 without impacting the performance of source database 110 and without the need to extract and copy the data content of image 120 into a second (target) database.

SUMMARY

In some embodiments, the invention provides run-time methods to access an image of a source database, wherein the source database is accessed through a first database management system. The methods include receiving a query directed to a target database, redirecting the query to a file associated with the database image, receiving data from the file associated with the database image in response to the query, generating return data by substituting database identifiers in the received data associated with the database image with database identifiers associated with the target database, and providing the return data to a requesting application executing in a target database management system. The source and target database management systems may be the same or different instantiations of a common database management system and may execute on the same or different computer system platforms. In other embodiments, the invention provides storage devices having instructions for causing a programmable control device to perform acts in accordance with the aforementioned methods. In still other embodiments, the invention provides computer systems adapted to perform the acts in accordance with the aforementioned methods.

DETAILED DESCRIPTION

The invention relates generally to computer databases and more particularly, but not by way of limitation, to methods and devices for providing run-time access to a source database image through a target database management system (DBMS).

Figure 1:
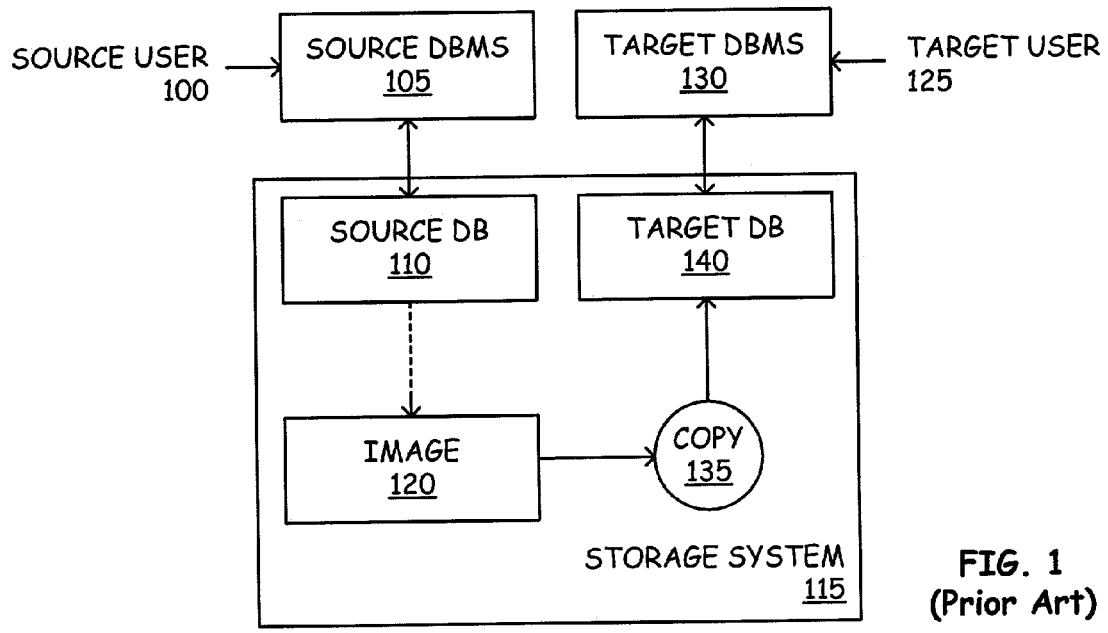
FIG. 1 shows a block diagram of a prior art system wherein an image of a source database is copied into a target database so that it may be accessed.
Figure 2:
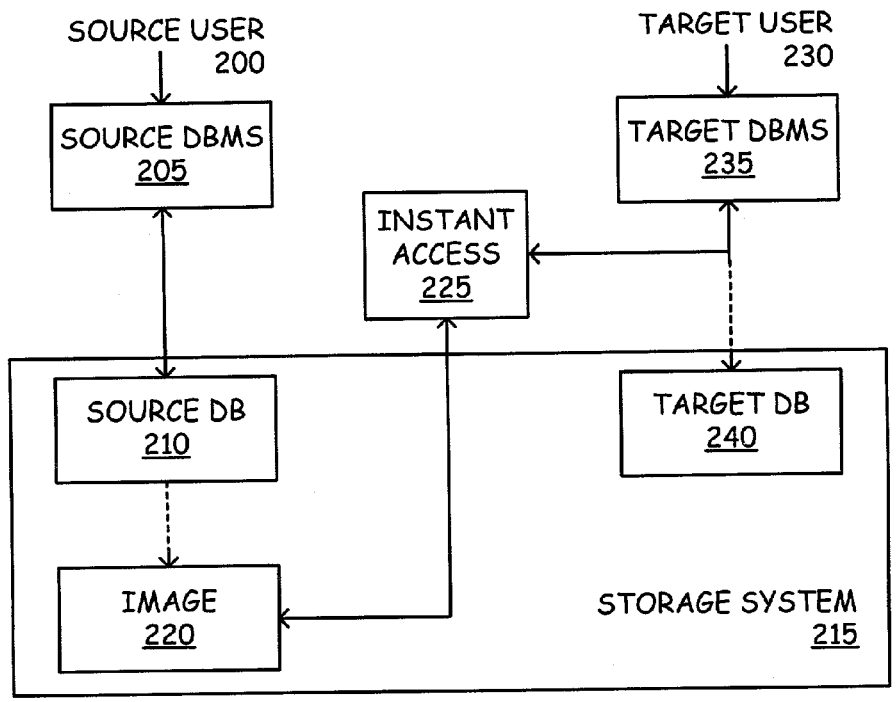
FIG. 2 shows a block diagram of a computer database system in accordance with one embodiment of the invention.

An illustrative computer database system in accordance with one embodiment of the invention is shown in FIG. 2. Source user 200 interacts with source DBMS 205 to access (read and write) source database 210 retained in storage system 215. As in prior art systems, image copies (often referred to as "snapshots") of source database 210 are often made for archival, backup and disaster recovery purposes. Access methods 225 in accordance with the invention provide target user 230 with run-time access to image 220 through target DBMS 235 such that it appears, to both target user 230 and target DBMS 235, that target user 230 is accessing source database 210's content (that is, image 220's content) via target database 240. This view of target user 230 with respect to target database 240 is represented in FIG. 2 as a dashed line between target DBMS 235 and target database 240. Conceptually, target database 240 may be considered a "phantom" database and may be no more than a collection of empty data structures. Thus, techniques in accordance with the invention provide instant access to a source database's image copy without the need to extract and copy the image's content into another database.

Figure 3A:
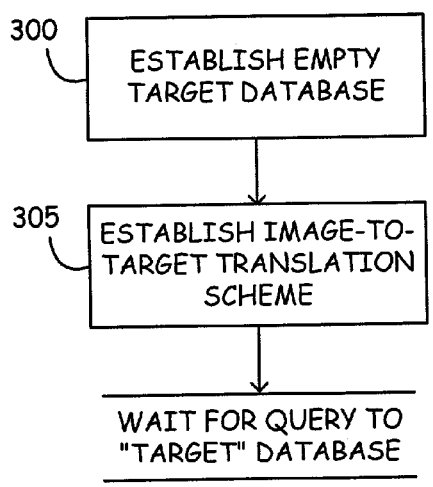
FIGS. 3A and 3B show, in flowchart form, the general operational phases of a method in accordance with the invention.

The general operational characteristics of access methods 225 in accordance with the invention may be divided into two phases. In phase 1, shown in FIG. 3A, an empty target database having the same structure (schema) as the source database is established in a target DBMS (block 300). For example, if the source database is a relational database, the target database may comprise a collection of one or more empty tables. If the source database is a hierarchical database, the target database may comprise a collection of one or more empty trees, and if the source database is a flat database, the target database may comprise a collection of one or more empty files. It should be noted that the target database may be established in the same or a separate instantiation of the source DBMS. In addition, the source and target databases may reside on a common storage device, or they may be distributed between two or more disparate storage devices.

One of ordinary skill in the art will know that when a database is created, its DBMS generates and associates unique DBMS-specific (internal) identifiers for each element of the database. These internal identifiers are what the DBMS generally uses to access the database's stored data (i.e., content). For example, when a DB2 ® database from the International Business Machines corporation of Armonk, N.Y. is defined, the underlying instance of the DBMS generates, inter alia, a database identifier (DBID), table identifiers (OBID) and table space identifiers (PSID). (One of ordinary skill in the art will recognize that other relational databases such as those provided by the Oracle corporation of Redwood City, Calif. and the Microsoft corporation of Redmond, Calif. and the Sun Microsystems corporation of Palo Alto, Calif. have similar internal identifiers, although they may go by different names.) It will further be recognized that other databases than the claimed access techniques are applicable to database technologies other than relational databases. For example, when the database image comprises an Information Management System (IMS) database image, illustrative database identifiers include the data set name as used in the database definition (DBD) and access control block (ACB) generation process. This information, along with the filenames of where these components are physically stored, are typically retained in the DBMS' catalog.

Once the empty target database has been defined in the target DBMS, a translation scheme to map queries from the target DBMS (directed to the target database) to the appropriate data in the image is established (block 305). For example, the translation scheme may map filenames associated with the empty target database to the appropriate file associated with the image and map source database internal identifiers with target database internal identifiers so that retrieved data is returned to the target DBMS with target DBMS consistent identifiers.

In one embodiment, the target database is created automatically by a computer executed method. This program may determine the source database's schema through an automated discovery mechanism (e.g., by querying the source DBMS or via interrogation of the image itself) or it may be manually input by a user—typically a database administrator (DBA). This method may also automatically generate the image-to-target translation scheme. In another embodiment, the target database may be created independently of the inventive technique and, in such a case, the internal database identifiers (including specified file names) associated with the target database must be made known to the image-to-target translation scheme. In this latter embodiment, the translation scheme may be automatically generated or may be manually provided by a user.

Figure 3B:
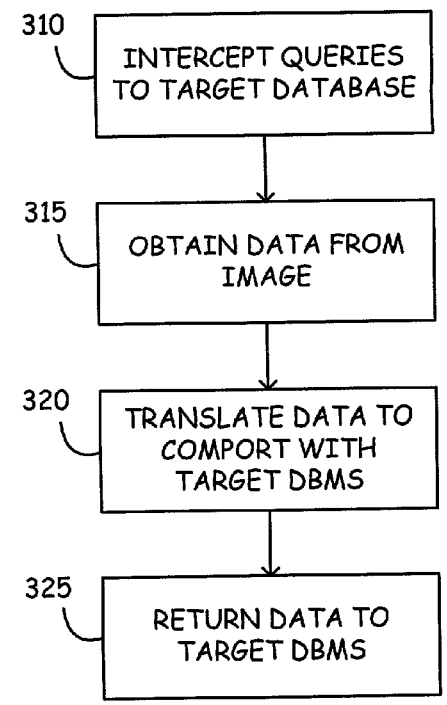

In phase 2, shown in FIG. 3B, methods in accordance with the invention thereafter intercept queries directed to the target database from the target DBMS (block 310). Using the translation scheme established during phase 1, the image is interrogated to retrieve the targeted data (block 315). Once retrieved, the internal identifiers associated with the retrieved data are converted from those of the image (i.e., source database) to those associated with the target database (block 320). After the data's internal DBMS identifiers have been converted, the data is returned to the target database (block 325) for delivery to the target user. Techniques for intercepting commands issued by the target DBMS are known in the art and, in a preferred embodiment, are handled in a manner transparent to the DBMS.

One of ordinary skill in the art will recognize that the acts of block 310 include the ability to intercept user requested changes. For example, intercepted queries may request that a change be made to target database 240 (i.e., image 220). In one embodiment such changes may be made directly to image 220. In another embodiment such changes may be recorded to a file (a log file, for example) for recording such requested changes. The file may then be used to update image 220 at a later time. In yet another embodiment image 220 is a read-only file and any change requests, therefore, would be rejected.

One benefit of the invention is that, using hardware copy-on-demand techniques, access to an image may be granted substantially immediately after the image has been created, but before the underlying source database has been completely copied. This can make the image available to target users substantially faster than in prior techniques which require the copy to be complete. This is because, prior art techniques read and extract all of an images' data to populate a target database. In a copy-on-demand environment, the hardware tasked to produce an image of the source database does so in the normal course of operations. If a target user attempts to access data that has not yet been copied into the image, the data can be retrieved from the source database and, substantially simultaneously, written into the image and translated in accordance with the invention and provided to the target user.

Another benefit of access techniques in accordance with the invention is that access to image 220 (via "shadow" target database 240) is provided through target database system 235 so that significantly less central processor (CPU) and input-output (I/O) processing is required of source database system 205. This, in turn, may result in improved operational performance for those applications accessing databases through source DMBS 205.

Yet another benefit of access techniques in accordance with the invention is that large savings in storage consumption may be realized. For example, a single image may be accessed by a plurality of users, each of which may be executing different instantiations of a common DBMS. Unlike prior art techniques which require a copy of the image's data (i.e., the source database at the time the image was created) in each of these plurality of DBMS's, techniques in accordance with the invention require only that the source database's schema be defined in each of the plurality of DBMS'S. Whereas a database's content can be many hundreds of megabytes, gigabytes or even terabytes in size, a database's schema is typically only a few kilobytes. For large source databases, the savings in storage space when just a single alternative DBMS (e.g., target DMBS 235) accesses an image may be significant.

Still another benefit of access techniques in accordance with the invention is that each target DMBS providing access to an image may record a user's (e.g., target user 230) requested changes in a journal so that one or more of these journals may be processed and used to update the image. Such updates may be performed in a "batch" mode wherein the user requested changes are sequenced in an off-line fashion.

In one illustrative embodiment, techniques in accordance with the invention provide run-time access to, and through, DB2 ® database management systems executing in an OS/390® operating system without copying the source database image's content into a target database. (DB2 and OS/390 are registered trademarks of the International Business Machines corporation of Armonk, N.Y.) It will be appreciated by one of ordinary skill in the art that the following description is illustrative only and should not to be considered limiting in any respect. For example, the inventive access techniques are equally applicable to, for example, other relational databases as well as to non-relational databases such as, for example, IMS databases.

Figure 4:
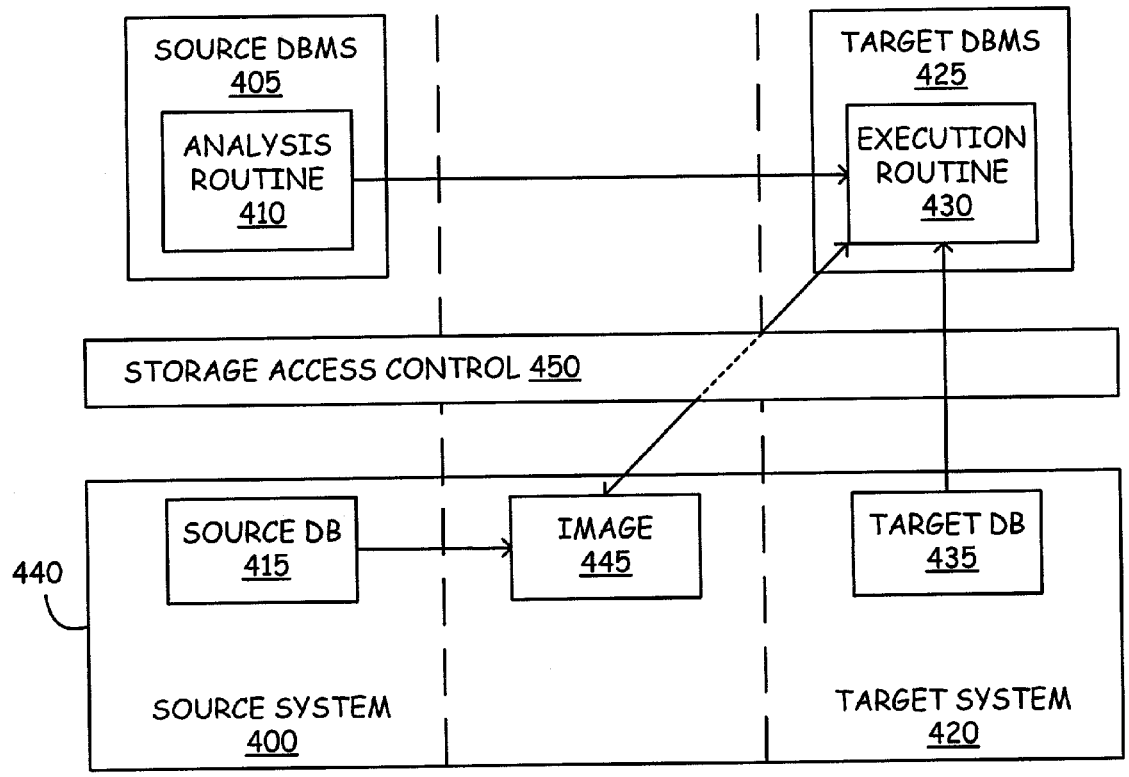
FIG. 4 shows a block diagram of an illustrative DB2 computer database system in accordance with one embodiment of the invention.

Referring now to FIG. 4, source database system 400 comprises source DB2 DBMS 405, analysis routine 410 executing within the source DB2 DBMS environment, and source DB2 database 415. Similarly, target database system 420 comprises target DB2 DBMS 425, execution routine 430 and target DB2 database 435. Image 445 comprises an image copy of source database 415. For example, image 445 may be created using the Instant Snapshot feature provided in, for example, the COPY PLUS FOR DB2 product from BMC Software, Inc. of Houston, Tex. Source and target DB2 databases 415 and 435 are retained in storage system 440 which may also retain source DB2 database image 445. Alternatively, each of source DB2 database 415, target DB2 database 435 and image 445 may be retained in another one or more storage systems. As is typical in many modern computer systems, applications such as source and target DB2 DBMS's 405 and 425 access information stored in storage system 440 by way of access control layer 450.

Figure 5:
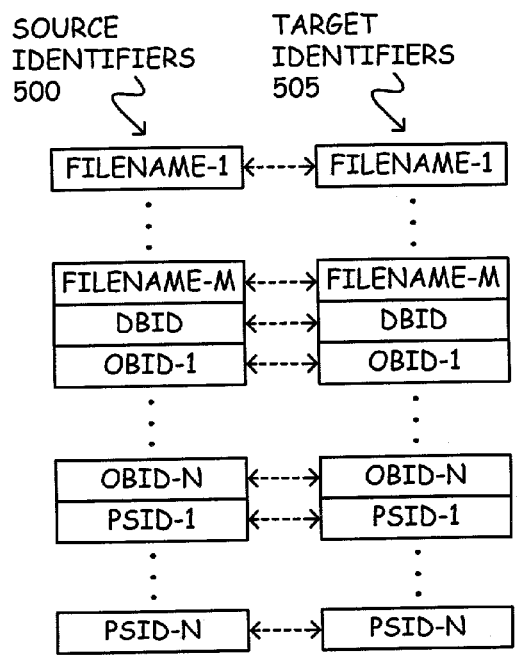
FIG. 5 shows one embodiment for a translation scheme in accordance with the invention.

In the illustrated embodiment, analysis routine 410 determines the schema and internal identifiers associated with image 445 and provides this information to execution routine 430. Based on the information obtained from analyzing source DB2 database 415 or image 445, empty target DB2 database 435 is created. As previously mentioned, target DB2 database may be created automatically by execution routine 430 or through another method. Target database 435 may also be generated by a database administrator. If target DB2 database 435 is created in a non-automated fashion, it may be beneficial to verify that the schema for source and target databases are identical. For example, the Change Manager product from BMC Software, Inc. of Houston, Tex. may be used to do this. Following establishment (and optional verification) of target DB2 database 435, execution routine 430 creates a translation scheme to map target DBMS calls to target DB2 database 435 to the appropriate stored content in image 445. As shown in FIG. 5, for example, the translation scheme may be embodied in a table look-up mechanism that maps source identifiers 500 such as filenames, database identifier (DBID), table identifiers (OBID) and table space identifiers (PSID) to like identifiers 505 for target database 435. Execution routine 430 may then "register" with storage access control mechanism 450 so that calls made to target DB2 database 435 from target DBMS 425 are "preprocessed" before being finally directed to storage system 440. That is, during operation calls by target DBMS 425 to target DB2 database 435 are intercepted by any convenient means before they are issued to underlying storage access control mechanism 450. For example, the extended Buffer Management (XBM) product from BMC Software, Inc. of Houston, Tex. may be used to do this. Upon interception, execution routine 430 redirects the initial query form a file associated with target DBMS 425 to the appropriate file in storage system 440 associated with image 445. Further, when storage access control mechanism 450 returns data from image 445, execution routine 430 substitutes target DBMS 425 internal identifiers for source DBMS 405 internal identifiers before returning the data to target DBMS 425. In addition, many data in image 445 may have values associated with them that refer to source DBMS 405 log files. These values must generally be translated by execution routine 430 before passing the retrieved data back to target DBMS 425. In one embodiment, references to source DBMS log files are replaced with zeros.

Various changes in the techniques described herein are possible without departing from the scope of the claims. For instance, acts in accordance with phase 1 and phase 2 illustrated in FIGS. 3A and 3B may be performed by a single computer executed method. Alternatively, the creation of an empty target database (block 300) may be performed by a first computer executed method while the translation scheme may be established by a second computer executed method (block 305). Further, either or both methods may be executed automatically or guided by a user. In addition, the acts of intercepting queries (block 310), obtaining data (block 315), translating data (block 320) and returning data (block 325) may be performed by a single integrated computer executed method or a combination of two or more computer executed methods. These various methods may execute on one or a plurality of computer system platforms. One of ordinary skill in the art will also recognize that the functions described herein for analysis routine 410 and execution routine 430 may be performed by a single program module.

Figure 6:
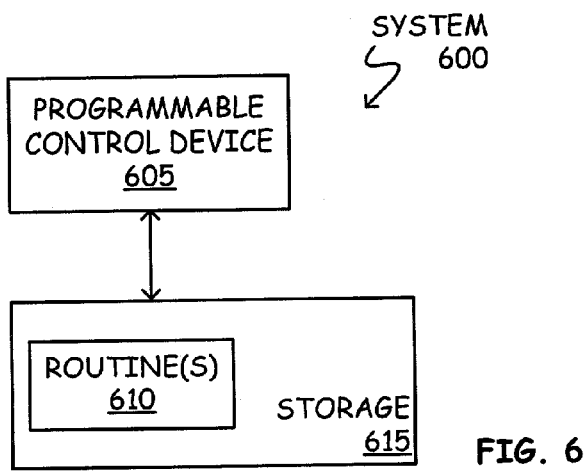
FIG. 6 shows a block diagram of a computer database system in accordance with another embodiment of the invention.

Referring to FIG. 6, it will be recognized by those of ordinary skill in the art that methods in accordance with the invention may be performed by system 600 comprising one or more programmable control devices 605 executing instructions organized into one or more program modules (e.g., routines 610) retained in one or more storage devices 615. A programmable control device may be a single computer processor, a plurality of computer processors coupled by a communications link or a custom designed state machine. Custom designed state machines may be embodied in a hardware device such as a printed circuit board comprising discrete logic, integrated circuits, or specially designed application specific integrated circuits (ASICs). Storage devices 615 suitable for tangibly embodying program instructions include all forms of non-volatile memory including, but not limited to: semiconductor memory devices such as erasable programmable read only memory (EPROM), electrically erasable programmable read only memory (EEPROM), and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method to provide run-time access to a database image, comprising:
   receiving a query directed to a first database;
   redirecting the query to a file associated with a database image;
   receiving data from the file associated with the database image in response to the query;
   generating return data by substituting database identifiers in the received data associated with the database image with database identifiers associated with the first database; and
   providing the return data.

2. The method of claim 1, wherein the act of receiving a query comprises receiving a query directed to a specified file associated with the first database.

3. The method of claim 2, wherein the first database and the database image comprise the same type of database.

4. The method of claim 3, wherein the first database and the database image comprise DB2 type databases.

5. The method of claim 4, wherein the act of substituting database identifiers comprises substituting an OBID value associated with the image database with an OBID value associated with the first database.

6. The method of claim 5, wherein the act of substituting database identifiers further comprises substituting a specified value in the returned data for a log file identifier in the data received from the file associated with the database image.

7. The method of claim 3, wherein the first database and the database image are Information Management System (IMS) type databases.

8. The method of claim 7, wherein the act of substituting database identifiers comprises substituting a data set name value associated with the image database with an data set name value associated with the first database.

9. The method of claim 3, wherein the first database is accessible through a first database management system (DBMS) application and the database image was created through a second DBMS application.

10. The method of claim 9, wherein the first and second DBMS applications are different DBMS applications.

11. The method of claim 10, wherein the first and second DBMS applications execute on the same computer system.

12. The method of claim 10, wherein the first and second DBMS applications execute on different computer systems.

13. The method of claim 1, further comprising:
    determining the database image schema;
    creating the first database based on the database image schema, the first database having substantially the same schema as the database image schema and comprising one or more empty data structures; and
    generating a translation scheme for translating file names associated with the database image schema to file names associated with the first database and for further translating database identifiers associated with the database image schema to database identifiers associated with the first database.

14. The method of claim 13, wherein the acts of determining, creating and generating are performed by a single computer executed application.

15. The method of claim 13, wherein the acts of determining, creating and generating are performed by two or more computer executed applications.

16. The method of claim 1, wherein the act of providing comprises returning the return data to a database management system application.

17. A program storage device, readable by a programmable control device, comprising instructions stored on the program storage device for causing the programmable control device to:
    receive a query directed to a first database;
    redirect the query to a file associated with a database image;
    receive data from the file associated with the database image;
    generate return data by substituting database identifiers in the received data associated with the database image with database identifiers associated with the first database; and
    provide the return data.

18. The program storage device of claim 17 wherein the instructions to receive a query comprise instructions to receive a query directed to a specified file associated with the first database.

19. The program storage device of claim 17, wherein the instructions to query, redirect, receive, generate and provide comprise instructions to access DB2 type databases.

20. The program storage device of claim 19, wherein the instructions to substitute database identifiers comprise instructions to substitute an OBID value associated with the image database with an OBID value associated with the first database.

21. The program storage device of claim 19, wherein the instructions to substitute database identifiers further comprise instructions to substitute a specified value in the returned data for a log file identifier in the data received from the file associated with the database image.

22. The program storage device of claim 17, wherein the instructions to query, redirect, receive, generate and provide comprise instructions to access Information Management System (IMS) type databases.

23. The program storage device of claim 22, wherein the instructions to substitute database identifiers comprise instructions to substitute a data set value associated with the image database with a data set value associated with the first database.

24. The program storage device of claim 17, wherein the instructions to receive a query comprise instructions to receive a query from a first database management system and the instructions to receive data comprise instructions to receive data from a database image whose source database was created in a second database management system.

25. The program storage device of claim 24, wherein the first and second database management systems comprise different database management systems.

26. The program storage device of claim 17, further comprising instructions to:
   determine the database image schema;
   create the first database based on the database image schema, the first database comprising one or more empty data structures; and
   generate a translation scheme for translating file names associated with the database image schema to file names associated with the first database and for further translating database identifiers associated with the database image schema to database identifiers associated with the first database.

27. The program storage device of claim 26, wherein the instructions to determine, create and generate are executed by a single computer executed application.

28. The program storage device of claim 26, wherein the instructions to determine, create and generate are executed by two or more computer executed applications.

29. A computer database system, comprising:
   storage system for storing a database image and a first database;
   a first database management system operatively coupled to the first database and to the storage system; and
   translator means operatively coupled to the storage system and to the first database management system for
      redirecting queries from the database management system directed to a specified file associated with the first database to a specified file associated with the database image,
      receiving data in response to the redirected query from the specified file associated with the database image, and
      substituting database identifiers in the received data associated with the database image with database identifiers associated with the first database.

30. The computer database system of claim 29, wherein the storage system comprise at least one storage device.

31. The computer database system of claim 29, wherein the first database and the database image comprise the same type of database.

32. The computer database system of claim 31, wherein the first database and the database image comprise DB2 type databases.

33. The computer database system of claim 31, wherein the first database and the database image comprise Information Management System (IMS) type databases.

34. The computer database system of claim 29, wherein the translator means executes within the first database management system application.

35. A method to provide run-time access to a database image, comprising:
   receiving a query directed to a target DB2 database from a DB2 application;
   redirecting the query to a file associated with a DB2 database image;
   receiving data from the file associated with the DB2 database image in response to the query;
   generating return data by substituting database identifiers in the received data associated with the DB2 database image with database identifiers associated with the target DB2 database; and
   providing the return data to the DB2 application.

36. The method of claim 35, wherein the act of receiving a query comprises receiving a query directed to a specified file associated with the target DB2 database.

37. The method of claim 35, wherein the act of substituting database identifiers comprises substituting an identifier value associated with the DB2 database image with an identifier value associated with the target DB2 database, the identifier selected from the group consisting of DBID, OBID and PSID.

38. The method of claim 37, wherein the act of substituting database identifiers further comprises substituting a specified value in the returned data for a log file identifier in the data received from the file associated with the DB2 database image.

39. The method of claim 35, further comprising:
   determining the DB2 database image schema;
   creating the target DB2 database based on the DB2 database image schema, the target DB2 database having one or more empty data structures and substantially the same schema as the DB2 database image; and
   generating a translation scheme for translating file names associated with the target DB2 database schema to file names associated with the DB2 database image and for further translating database identifiers associated with the DB2 database image schema to database identifiers associated with the target DB2 database.

* * * * *